(12) United States Patent
Ishio et al.

(10) Patent No.: US 6,802,222 B2
(45) Date of Patent: Oct. 12, 2004

(54) DIAPHRAGM-TYPE SEMICONDUCTOR DEVICE AND METHOD FOR MANUFACTURING DIAPHRAGM-TYPE SEMICONDUCTOR DEVICE

(75) Inventors: Seiichiro Ishio, Kariya (JP); Yasutoshi Suzuki, Okazaki (JP); Keiichi Shimaoka, Aichi-gun (JP); Hirofumi Funahashi, Aichi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/142,162

(22) Filed: May 10, 2002

(65) Prior Publication Data

US 2002/0171114 A1 Nov. 21, 2002

(30) Foreign Application Priority Data

May 15, 2001 (JP) ........................ 2001-144884

(51) Int. Cl.[7] .............. G01L 9/12; G01L 9/00; G01L 7/08
(52) U.S. Cl. .............. 73/718; 73/715; 73/724; 73/754; 361/283.1; 361/283.4
(58) Field of Search .................... 73/715, 718, 724, 73/754; 361/283.1, 283.4; 29/621.1

(56) References Cited

U.S. PATENT DOCUMENTS

| | | | |
|---|---|---|---|
| 4,838,088 A | | 6/1989 | Murakami |
| 5,321,989 A | | 6/1994 | Zimmer et al. |
| 5,332,469 A | * | 7/1994 | Mastrangelo .......... 216/2 |
| 5,369,544 A | * | 11/1994 | Mastrangelo .......... 361/283.4 |
| 5,431,057 A | | 7/1995 | Zimmer et al. |
| 5,804,736 A | * | 9/1998 | Klauder et al. .......... 73/724 |

FOREIGN PATENT DOCUMENTS

JP  A-2000-214035  8/2000

* cited by examiner

*Primary Examiner*—Andrew H. Hirshfeld
*Assistant Examiner*—Marissa Ferguson
(74) *Attorney, Agent, or Firm*—Posz & Bethards, PLC

(57) ABSTRACT

A diaphragm-type semiconductor device includes a semiconductor substrate, a surface of which is substantially flat, a diaphragm, which covers a circular pressure reference space located on the surface, and a circular electrode layer, a middle part of which is embedded in the diaphragm. The electrode layer is larger than the space and is coaxial with the space. Therefore, internal stress is balanced between inner and outer sides of the diaphragm, and a step formed at the outer edge of the top electrode layer is separated from the diaphragm. The device also includes a step adjuster around the space on the surface. Therefore, another step formed at the outer edge of the space disappears, and a new step is formed separately from the diaphragm at the outer edge of the step adjuster. With this structure, the diaphragm has a desired flatness.

15 Claims, 7 Drawing Sheets

DIAPHRAGM-TYPE SEMICONDUCTOR DEVICE AND METHOD FOR MANUFACTURING DIAPHRAGM-TYPE SEMICONDUCTOR DEVICE

CROSS REFERENCE TO RELATED APPLICATION

This application is based on and incorporates herein by reference Japanese Patent Application No. 2001-144884 filed on May 15.

BACKGROUND OF THE INVENTION

1. Field of the Invention

The present invention relates to a semiconductor device, which includes a diaphragm having a desired flatness, and to a method for manufacturing the device. The diaphragm is formed on a semiconductor substrate using semiconductor fabrication technology.

2. Related Art

A diaphragm-type semiconductor device, a cross-sectional view of which is shown in FIG. 1, is proposed in JP-A-2000-214035. In the proposed device, a circular bottom electrode layer 4 is located in a silicon substrate 2. A bottom etch-proof layer 8 is located on the substrate 2. A middle etch-proof layer 12 is located on the bottom etch-proof layer 8. A circular pressure reference space 28, which is coaxial with the bottom electrode layer 4, is defined by the etch-proof layers 12, 8. A circular top electrode layer 14, which is smaller than the pressure reference space 28 and has a hole 14b, is located on the middle etch-proof layer 12. As shown in FIG. 2, the top electrode layer 14 is coaxial with the pressure reference space 28. A terminal 14a for electrical connection is integrated with the top electrode layer 14. A top etch-proof layer 16 is located on the top electrode layer 14 and the middle etch-proof layer 12. A diaphragm 27 includes the middle etch-proof layer 12, the top electrode layer 14, and the top etch-proof layer 16. The diaphragm 27 has a hole 17, which is formed in the middle and top etch-proof layers 12 and 16. The hole 17 of the diaphragm 27 is sealed with a shield film 24.

The diaphragm 27 is deformed in response to external pressure applied to the diaphragm 27. When the diaphragm 27 is deformed, the distance between the top and bottom electrode layers 14, 4, is varied, and so is the static capacitance between the top and bottom electrode layers 14, 4. Therefore, the external pressure is sensed by measuring the capacitance between the top and bottom electrode layers 14 and 4.

The proposed device is manufactured by processing the silicon substrate 2 using a microchip manufacturing process, as shown FIGS. 3 to 6. First, the bottom electrode layer 4 is formed in a surface of the substrate 2 by doping a predetermined region in the surface with impurity ions. After depositing the bottom etch-proof layer 8 on the surface of the substrate 2, a circular etchable layer 10 (see FIG. 3), which is coaxial with the bottom electrode layer 4, is formed on the bottom etch-proof layer 8. After depositing the middle etch-proof layer 12 on the etchable layer 10 and the surface, a polycrystalline silicon layer is deposited on the middle etch-proof layer 12 and doped with impurity ions. Then, the top electrode layer 14, which is coaxial with the bottom electrode layer 4 and has the hole 14b, is defined by photolithography. Then, the top etch-proof layer 16 is deposited on the top electrode layer 14 and the middle etch-proof layer 12. At this stage, the device has the cross-sectional structure shown in FIG. 3

The hole 17 of the diaphragm 27 is formed in the middle and top etch-proof layers 12, 16 to permit the etchable layer 10 to communicate with the space outside of the device, as shown in FIG. 4. Subsequently, the etchable layer 10 is removed by etching the layer 10 through the hole 17 of the diaphragm 27 to form the diaphragm 27 and the pressure reference space 28, as shown in FIG. 5. Finally, the shield film 24 is deposited on the top etch-proof layer 16 to seal the hole 17 of the diaphragm 27, as shown FIG. 6.

It is preferred that the diaphragm 27 be flat and parallel to the surface of the silicon substrate 2, as shown in FIG. 1. However, as shown in FIG. 5, the diaphragm 27 is warped toward the surface. The measured flatness of the diaphragm 27 is shown in FIG. 15. In FIG. 15, a line AA shows the flatness after the etchable layer 10 is removed as shown in FIG. 5, and a line BB shows the flatness after the shield film 24 is deposited by plasma CVD as shown in FIG. 6, and a line CC shows the flatness when a pressure of 100 KPa is applied to the proposed device. Due to the warping of the diaphragm 27, the static capacitance between the top electrode layer 14 and the bottom electrode layer 4 is not proportional to the external pressure applied to the diaphragm 27. In the worst case, the diaphragm 27 contacts the surface, and the device is useless for sensing pressure.

In addition, the capacitance between the top and bottom electrode layers 14, 4 is affected by temperature in the proposed device. Therefore, the external pressure is not accurately measured unless the temperature is constant.

SUMMARY OF THE INVENTION

The present invention has been made in view of the above aspect with an object to provide a diaphragm-type semiconductor device, which has a desired linearity between static capacitance and external pressure and detects accurately the external pressure irrespective of temperature, and to provide a method for manufacturing the device. The desired linearity between static capacitance and external pressure is provided by forming a diaphragm with a desired flatness. The external pressure is detected accurately irrespective of temperature by building a reference capacitor in the device.

In the present invention, a circular top electrode layer is larger than a circular pressure reference space and is coaxial with the space. Therefore, internal stress is balanced between inner and outer sides of a diaphragm, and a step, which is formed at the outer edge of the top electrode layer and where the internal stress is concentrated, is separated from the diaphragm. Thus, the diaphragm is substantially flat.

In addition, a step adjuster is formed around the pressure reference space. Therefore, another step, which is formed at the outer edge of the pressure reference space and where the internal stress is concentrated, disappears, and a new step, which is separated from the diaphragm, is formed at the outer edge of the step adjuster. Thus, the diaphragm has a further desired flatness.

A reference capacitor, which has no pressure reference space, is built in the device. The capacitance of the capacitor depends only on temperature, not on pressure. A capacitance shift between the top electrode layer and a corresponding bottom electrode layer due to temperature variation is compensated for with the reference capacitor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

The present invention will be described in detail with reference to various embodiments.

First Embodiment

Figure 1:
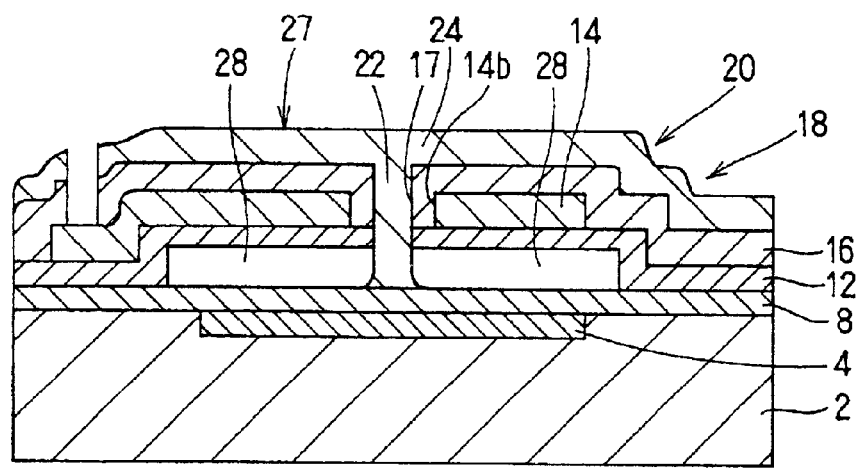
FIG. 1 is a cross-sectional view of the proposed diaphragm-type semiconductor device.
Figure 2:
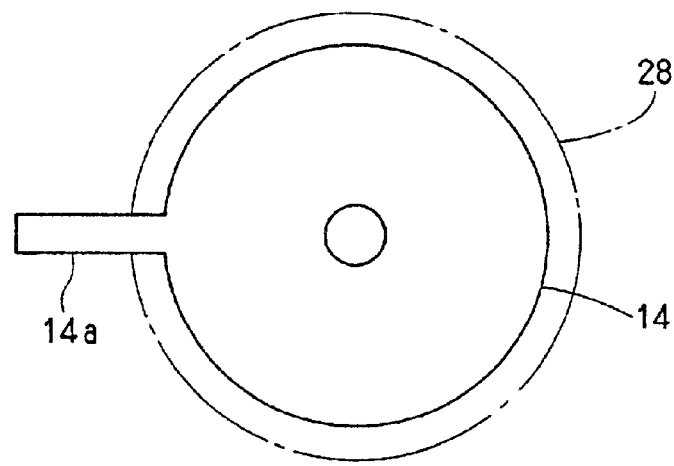
FIG. 2 is a plan view showing the positional relation between the pressure reference space and the top electrode layer in the proposed device.
Figure 3:
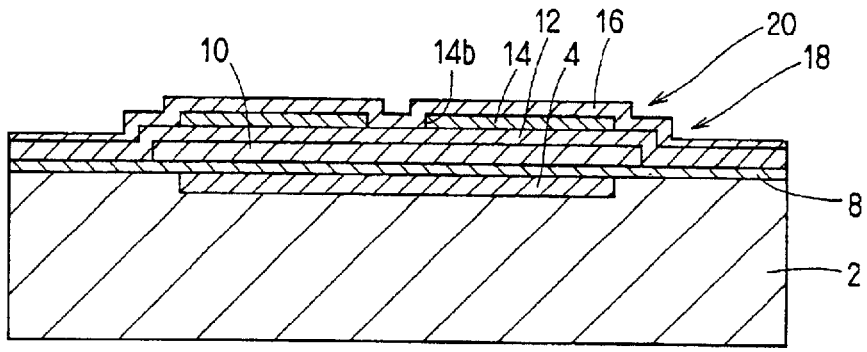
FIG. 3 is a cross-sectional view showing a state of the proposed device in the manufacturing process of the device.
Figure 4:
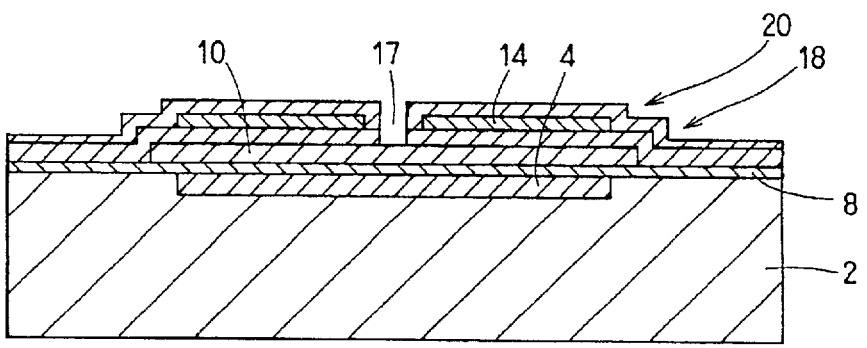
FIG. 4 is a cross-sectional view showing another state of the proposed device in the manufacturing process of the device.
Figure 5:
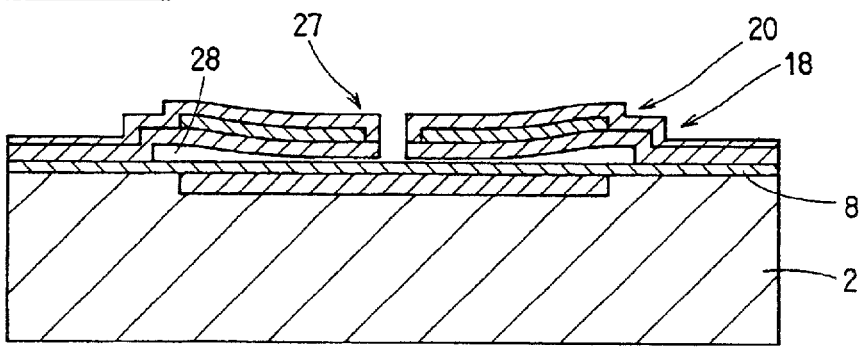
FIG. 5 is a cross-sectional view showing another state of the proposed device in the manufacturing process of the device.
Figure 6:
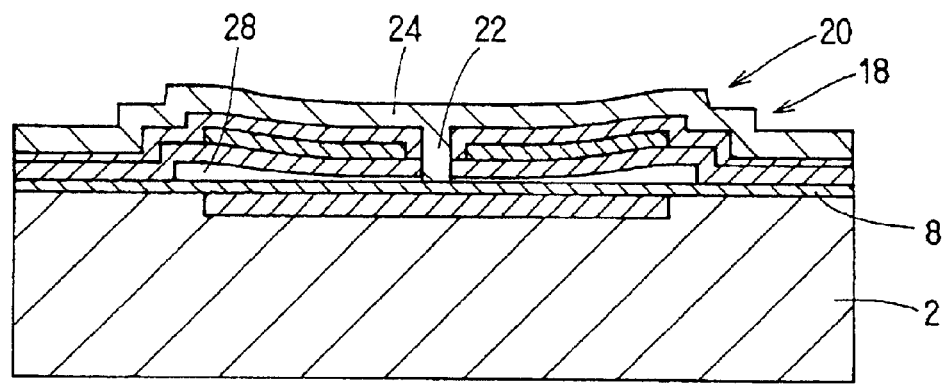
FIG. 6 is a cross-sectional view showing another state of the proposed device in the manufacturing process of the device.
Figure 7:
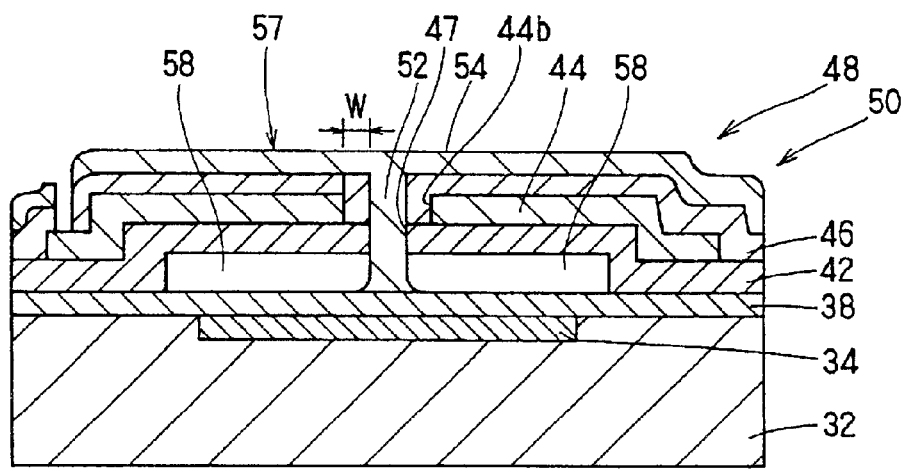
FIG. 7 is a cross-sectional view of a diaphragm-type semiconductor is device according to the first embodiment of the present invention.
Figure 8:
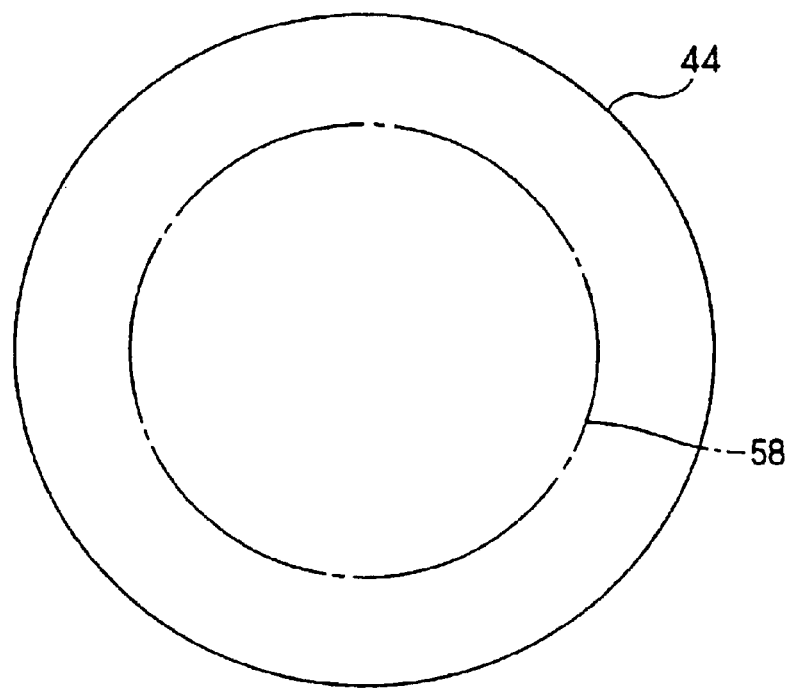
FIG. 8 is a plan view showing the positional relation between the pressure reference space and the top electrode layer in the device according to the first embodiment.

As shown in FIG. 7, a diaphragm-type semiconductor device according to a first embodiment has a silicon substrate 32, which has a substantially flat surface, a circular diaphragm 57, which forms the top of a circular pressure reference space 58 located above the substrate 32, and a circular top electrode layer 44, the middle part of which is included in the diaphragm 57. The top electrode layer 44 is larger than the pressure space 58 and is coaxial with the space 58, as shown in FIG. 8. That is, a projection of the space 58 onto the substrate is within that of the top electrode layer 44. In this embodiment, the electrode layer 44 also serves as the terminal 14a in the proposed device, so the device in FIG. 7 has no dedicated terminal that is connected to the electrode layer 44, as shown in FIG. 8. The diaphragm-type semiconductor device of the first embodiment includes a bottom etch-proof layer 38 located on the substrate 32 and a shield film 52, 54 located above the diaphragm, in a manner similar to the device shown in FIGS. 1 and 2.

One of the reasons that the diaphragm 27 in the proposed device warps is that the middle and top etch-proof layers 12, 16 have internal tensile stress, and an imbalance in the stress between the inner and outer sides of the diaphragm 27 is compensated for by deformation of the diaphragm 27 toward the pressure reference space 28 when the etchable layer 10, which underlies the diaphragm 27, is removed. Another reason is that the stress is concentrated at steps 20, 18, which are near the periphery of the diaphragm 27. The step 18 is formed at the outer edge of the etchable layer 10. The step 20 is formed at the outer edge of the top electrode layer 14.

Figure 16:
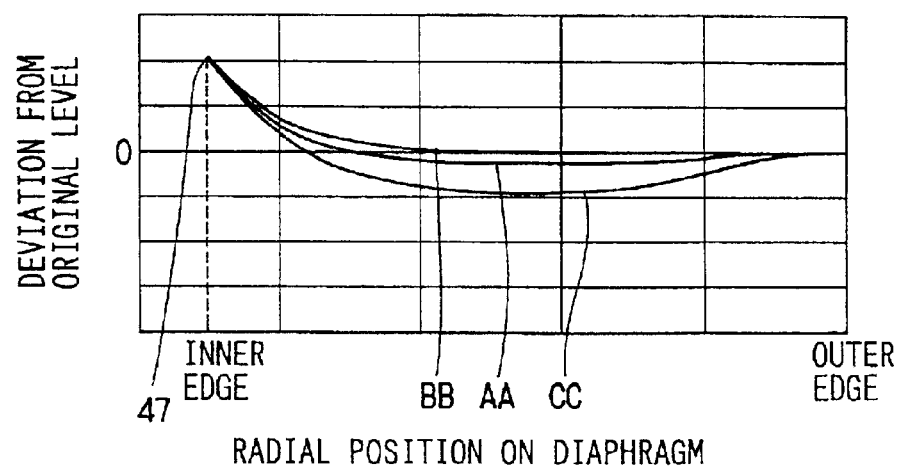
FIG. 16 is a graph showing the flatness of the diaphragm in the device according to the first embodiment.

In the diaphragm-type semiconductor device in FIG. 7, the imbalance in the stress is alleviated, and a step 50, which is formed at the outer edge of the top electrode layer 44, is separated from the diaphragm 57. Therefore, the diaphragm 57 has a desired flatness, as shown in FIG. 16. In FIG. 16, a line AA shows the flatness of the diaphragm 57 after a circular etchable layer (not shown), which occupies the space 58 during the manufacturing of the device in FIG. 7, is removed in the manufacturing process, and a line BB shows the flatness of the diaphragm 57 after a shield film 54 is deposited by plasma CVD in the manufacturing process, and a line CC shows the flatness of the diaphragm 57 when a pressure of 100 KPa is applied to the device shown in FIG. 7. As shown in FIG. 16, the diaphragm 57 is still warped around a hole 47. However, the warping around the hole 47 is improved by adjusting the width W of a central part of the diaphragm 57, where the middle and top etch-proof layers 42 and 46 are in contact with each other. It is possible to change the width W by adjusting the size of a hole 44b of the top electrode layer 44.

The structure shown in FIG. 7, in which the periphery of the top electrode layer 44 is located outside the diaphragm 57, is disadvantageous to some extent with respect to sensitivity in pressure detection because the periphery does not contribute to capacitance variation. However, the decreased sensitivity is compensated for by reducing distance between the top and bottom electrode layers 44, 34. The diaphragm 57 is so flat that the distance is reduced by decreasing height of the pressure reference space 58. Therefore, the device in FIG. 7 has a higher sensitivity in pressure detection than the proposed device of FIG. 1.

The diaphragm-type semiconductor device in FIG. 7 is manufactured by processing a silicon substrate 32 using the same microchip manufacturing process shown in FIGS. 3 to 6. However, when the top electrode layer 44 is formed, the size of the electrode layer 44 is greater than the etchable layer that forms space 58 and the electrode layer 44 is aligned coaxially with the etchable layer.

Second Embodiment

A diaphragm-type semiconductor device according to a second embodiment has a step adjuster around a circular pressure reference space 88. The step adjuster is an annular etchable layer 71 in FIG. 9. However the step adjuster may be multiple concentric annular etchable layers, as shown in FIG. 10, in which the step adjuster has three concentric annular etchable layers 71a, 71b, and 71c. As in the first embodiment of FIG. 7, a circular top electrode layer 74 is larger than the pressure reference space 88 and is coaxial with the pressure reference space 88. Also, as in the first embodiment the diaphragm-type semiconductor device of the second embodiment includes bottom and top electrodes, 64, 74, a top etch-proof layer 76 and a shield film 82. 84 located above the diaphragm.

With the annular etchable layer 71 (or the three concentric annular etchable layers 71a, 71b, 71c), a step 48, which is formed at the outer edge of the pressure reference space 58, disappears, and a step 79, which is separated from a diaphragm 87, is formed at the outer edge of the annular etchable layer 71 (or the three concentric annular etchable layers 71a, 71b, 71c). Therefore, the flatness of the diaphragm 87 is further improved.

Figure 9:
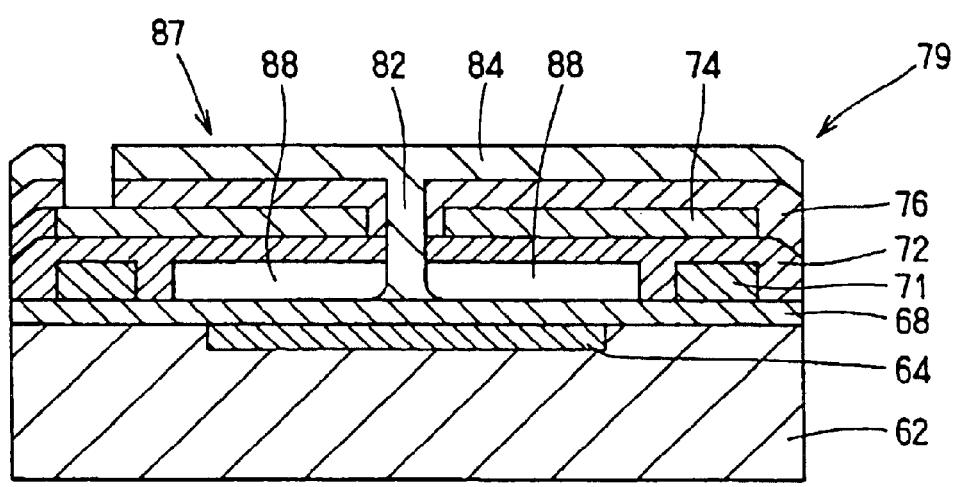
FIG. 9 is a cross-sectional view showing an example of a diaphragm-type semiconductor device according to the second embodiment.
Figure 10:
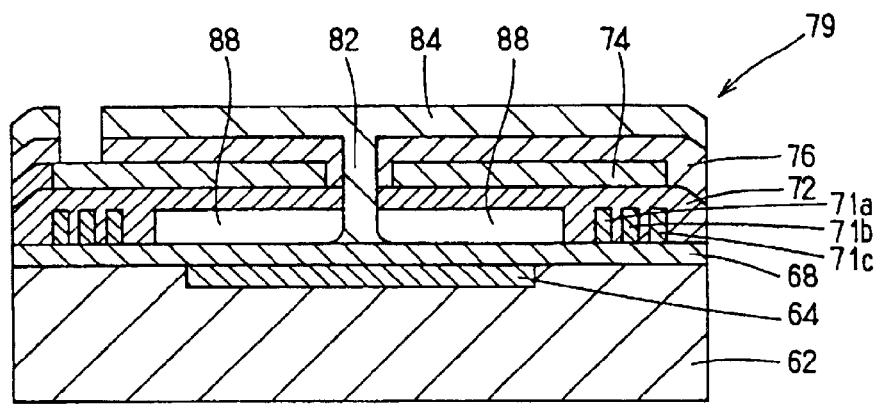
FIG. 10 is a cross-sectional view showing a variation of the device according to the second embodiment.

The diaphragm-type semiconductor devices in FIGS. 9 and 10 are manufactured by processing a silicon substrate 62 using the same process used to make the diaphragm-type semiconductor device in FIG. 7. However, when forming a circular etchable layer (not shown), which occupies the space 88 during manufacturing, on a bottom etch-proof layer 68, the annular etchable layer 71 is (or the three concentric annular etchable layers 71a, 71b, 71c are) formed around the circular etchable layer 70 on the bottom etch-proof layer 68. The annular etchable layer 71 is (or the three concentric annular etchable layers 71a, 71b, 71c is are) covered and protected by a middle etch-proof layer 72, so the annular etchable layer 71 is (or the three concentric annular etchable layers 71a, 71b, 71c are) left in the device in FIG. 7 after the circular etchable layer that forms space 88 is removed by etching to form the pressure reference space 88.

Third Embodiment

Figure 11:
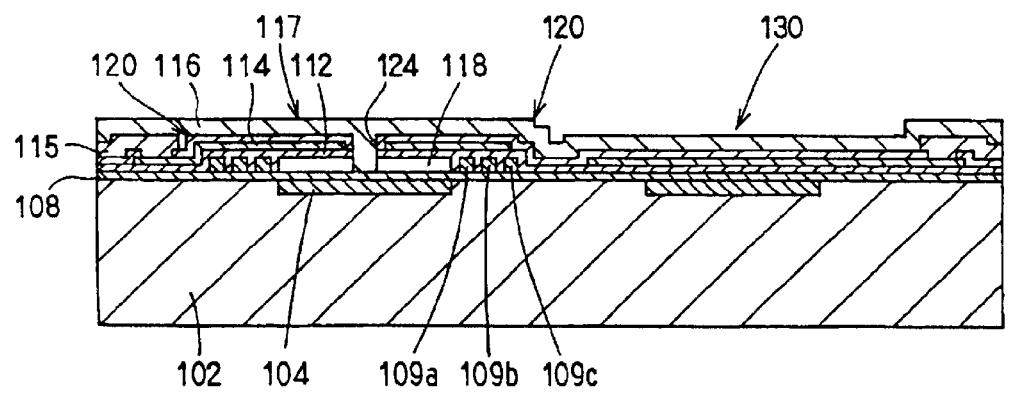
FIG. 11 is a cross-sectional view of a diaphragm-type semiconductor device according to the third embodiment.

As shown in FIG. 11, a diaphragm-type semiconductor device according to a third embodiment includes a reference capacitor 130, which has no pressure reference space, and a pressure-sensing part, which has the same structure as the device in FIG. 10. The capacitance of the capacitor 130 depends only on temperature, not on pressure. Therefore, capacitance shift between a top electrode layer 114 and a bottom electrode layer 104 due to temperature variation is compensated for by using the reference capacitor 130.

Figure 12:
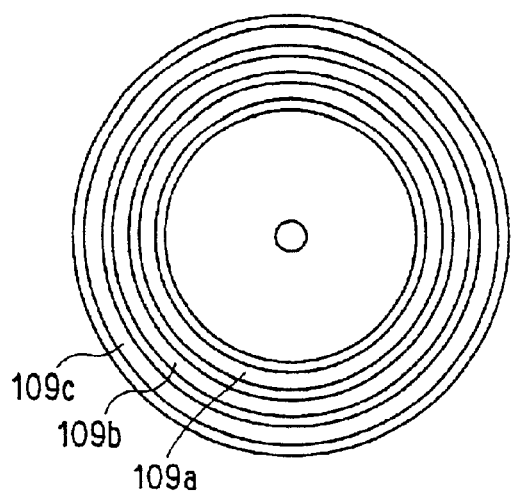
FIG. 12 is a plan view showing an example of the step adjuster surrounding the pressure reference space.
Figure 13:
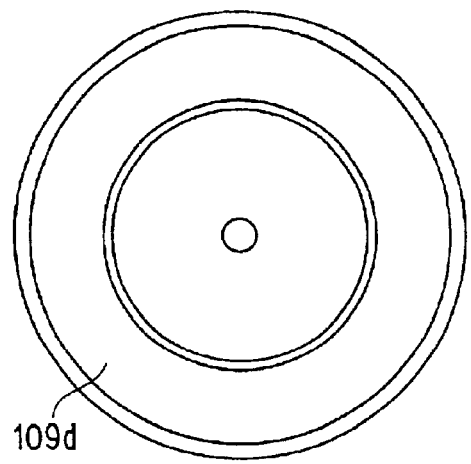
FIG. 13 is a plan view showing another example of the step adjuster.
Figure 14:
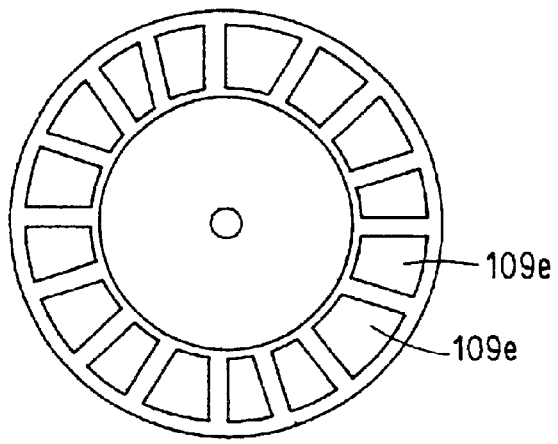
FIG. 14 is a plan view showing another example of the step adjuster.
Figure 15:
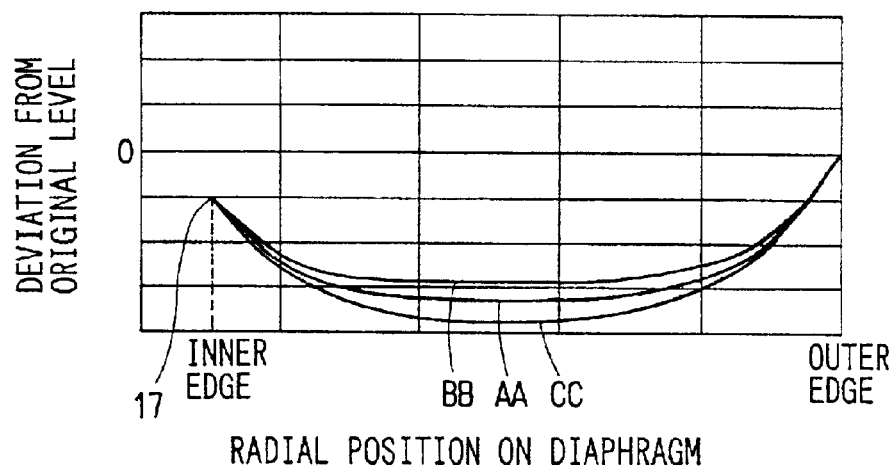
FIG. 15 is a graph showing the flatness of the diaphragm in the proposed device.

The device in FIG. 11 has a step adjuster including three concentric annular etchable layers 109a, 109b, and 109c, which are located around a pressure reference space 188, as shown in FIG. 12. However, the step adjuster may be an annular etchable layer 109d, as shown in FIG. 13. The annular etchable layer 109d may be divided into a plurality of etchable layers 109e that are spaced apart in the angular direction, as shown in FIG. 14. In the diaphragm-type semiconductor device shown in FIG. 11, a step 120 is separated from a diaphragm 117, so the diaphragm 117 is relatively flat. A top electrode layer 114 is electrically connected to a wiring 115. Although not shown, a bottom electrode layer 104 is also electrically connected to another wiring. The diaphragm-type semiconductor device according the third embodiment also includes a bottom etch-Proof layer 108, which is located on the substrate 102 a middle etch proof layer 112, which is located on the bottom etch-proof layer 108 a circular pressure reference space 118 and a shield film 116, 124, which is located above the diaphragm.

Modifications

In the embodiments of FIGS. 1, 7, 9, and 11, the top electrode layer 14, 44, 74, 114 is made of polycrystalline silicon. Alternatively, metals such as aluminum may be used for the top electrode layer 14, 44, 74, 114. Material for the substrate is not limited to silicon. Material and shape of members in the embodiments of FIGS. 1, 7, 9, and 11 may be modified further within the spirit of the present invention.

What is claimed is:

1. A diaphragm-type semiconductor device comprising:
    a semiconductor substrate having a substantially flat surface;
    an electrode layer located above the substantially flat surface; and
    a diaphragm, which includes a middle part of the electrode layer and which covers a pressure reference space located on the substantially flat surface, wherein an entire projection of the pressure reference space onto the substantially flat surface of the semiconductor substrate is within that of the electrode layer and pressure is sensed on a basis of capacitance variation caused by deformation of the diaphragm.

2. The device as in claim 1 further comprising a reference capacitor, the capacitance of which is not affected by pressure.

3. A diaphragm-type semiconductor device comprising:
    a semiconductor substrate having a substantially flat surface;
    a diaphragm that covers a pressure reference space located on the substantially flat surface; and
    a step adjuster located around the pressure reference space on the substantially flat surface, wherein the step adjuster has substantially the same height, as measured from the substrate, as the pressure reference space, and wherein pressure is sensed on a basis of capacitance variation caused by deformation of the diaphragm.

4. The device as in claim 3 further comprising a reference capacitor, the capacitance of which is not affected by pressure.

5. A diaphragm-type semiconductor device as in claim 3, further comprising an electrode provided above the diaphragm for forming a capacitance, wherein the step adjuster is located between the semiconductor substrate and the electrode, wherein the electrode has no substantial step between the diaphragm and the step adjuster.

6. A diaphragm-type semiconductor device as in claim 3, wherein the step adjuster is comprised of a plurality of concentric annular etchable layers.

7. A diaphragm-type semiconductor device comprising:
    a semiconductor substrate;
    a diaphragm provided above a surface of the semiconductor substrate for covering a pressure reference space defined on the semiconductor substrate;
    a bottom electrode layer provided in the semiconductor substrate and beneath the pressure reference space; and
    a top electrode layer provided in the diaphragm, wherein the top electrode layer is for forming a capacitor with the bottom electrode,
    wherein a projection of the pressure reference space is smaller than that of the top electrode layer and is located inside that of the top electrode layer.

8. A diaphragm-type semiconductor device as in claim 7, further comprising a step adjuster disposed above the surface of the semiconductor substrate, around the pressure reference space and below the top electrode layer.

9. A diaphragm-type semiconductor device as in claim 8, wherein the step adjuster is comprised of a plurality of concentric annular etchable layers.

10. A diaphragm-type semiconductor device comprising:
    a semiconductor substrate;
    a diaphragm provided above a surface of the semiconductor substrate for covering a pressure reference space defined on the semiconductor substrate;

a bottom electrode layer provided in the semiconductor substrate and beneath the pressure reference space; and a top electrode layer provided in the diaphragm for forming a capacitor with the bottom electrode, wherein the top electrode layer completely extends outwardly beyond the pressure reference space.

11. A diaphragm-type semiconductor device comprising:

a semiconductor substrate;

a diaphragm provided above a surface of the semiconductor substrate for covering a pressure reference space defined on the semiconductor substrate;

a bottom electrode layer provided in the semiconductor substrate and beneath the pressure reference space;

a top electrode layer provided in the diaphragm for forming a capacitor with the bottom electrode, wherein the top electrode layer extends outwardly beyond the pressure reference space; and a step adjuster disposed above the surface of the semiconductor substrate, around the pressure reference space and below the top electrode layer.

12. A diaphragm-type semiconductor device as in claim 11, wherein the step adjuster is comprised of at least one annular etchable layer.

13. A diaphragm-type semiconductor device as in claim 7, wherein a static capacitance between the top electrode layer and the bottom electrode layer is proportional to an external pressure applied to the diaphragm when the external pressure is less than or equal to approximately 100 KPa.

14. A diaphragm-type semiconductor device as in claim 1, wherein the electrode layer is forming a capacitance.

15. The device according to claim 3, wherein the step adjuster lies in the same plane as the pressure reference space.

* * * * *